United States Patent
Binda et al.

(10) Patent No.: US 7,670,133 B2
(45) Date of Patent: Mar. 2, 2010

(54) TWIN-SHEET THERMOFORMING OF PLASTIC FUEL TANKS

(75) Inventors: Gabriele Binda, Malgesso (IT);
Francesco Fiorentini, Milan (IT);
Davide Mariani, Saronno (IT);
Loredano Sbrana, Varese (IT); Carlo Ortenzi, Milan (IT)

(73) Assignee: Canon S.p.A., Trezzano sul Naviglio (MI) (IT)

( * ) Notice: Subject to any disclaimer, the term of this patent is extended or adjusted under 35 U.S.C. 154(b) by 1069 days.

(21) Appl. No.: 10/541,466

(22) PCT Filed: Dec. 30, 2003

(86) PCT No.: PCT/EP03/14962

§ 371 (c)(1),
(2), (4) Date: Jul. 6, 2005

(87) PCT Pub. No.: WO2004/062889

PCT Pub. Date: Jul. 29, 2004

(65) Prior Publication Data

US 2006/0113716 A1    Jun. 1, 2006

(30) Foreign Application Priority Data

Jan. 10, 2003  (IT) .......................... MI2003A0027

(51) Int. Cl.
*B29C 51/00* (2006.01)
(52) U.S. Cl. .................. 425/504; 425/503; 425/508; 425/509
(58) Field of Classification Search .............. 264/545; 425/504, 503, 508, 509
See application file for complete search history.

(56) References Cited

U.S. PATENT DOCUMENTS

| 2,796,033 A | | 6/1957 | Feinstein |
| 3,779,687 A | | 12/1973 | Alesi |
| 5,158,786 A | * | 10/1992 | Reil et al. .................. 425/341 |
| 5,256,365 A | * | 10/1993 | Gordon et al. .............. 264/509 |
| 5,975,879 A | * | 11/1999 | Dresen et al. ............... 425/504 |
| 6,372,176 B1 | | 4/2002 | Ekendahl et al. |

FOREIGN PATENT DOCUMENTS

| DE | 39 36 891 | 8/1991 |
| FR | 1 515 385 | 1/1968 |
| JP | 57167211 | 10/1982 |
| JP | 05229015 | 7/1993 |
| WO | WO 02/14050 | 2/2002 |
| WO | WO 03/097330 | 11/2003 |

* cited by examiner

*Primary Examiner*—Kat Wyrozebski
*Assistant Examiner*—Xue Liu
(74) *Attorney, Agent, or Firm*—Young & Thompson

(57) ABSTRACT

A method and a plant for twin-sheet thermoforming of fuel tanks; first and second sheets (SA, SB) of thermoformable plastic material, are separately fed along respective processing lines (10A, 10B). The sheets (SA, SB) are heated and gripped along their peripheral edges by a pneumatically actuate suction and vacuum holding device (15A, 15B), for supporting the heated sheets (SA, SB) in a substantially flat condition while they are moved towards a respective thermoforming station (16A, 16B). Both the molds (17A, 17B) are disposed side by side with their open cavity facing upwards. After thermoforming of the plastic sheets (SA, SB), one of the molds (17B) is turned upside down onto the other mold (17A), to overlap and weld superimposed sealing areas of the two thermoformed shells (GA, GB). Cooling of the molds and thermoformed tank may be performed on a side of the processing lines (10A, 10B).

12 Claims, 7 Drawing Sheets

TWIN-SHEET THERMOFORMING OF PLASTIC FUEL TANKS

FIELD OF THE INVENTION

This invention refers to the thermoforming of plastic fuel tanks having high structural features and gas barrier, starting from layered sheets of plastic material, such as high-density polyolefin with EVOH barrier for containment of fuel vapors; in particular the invention relates to a method for manufacturing fuel tanks by "twin-sheet" thermoforming technology, and relative plant.

PRIOR ART

Metal fuel tanks are widely used in several fields, for example for supply fuel to internal combustion engines, both in terrestrial and nautical vehicles and in aircrafts, as well as for other uses; however, the metal fuel tanks currently in use are heavy, difficult to shape and subjected to corrosion.

The current tendency is to replace the metal fuel tanks with fuel tanks in layered plastic material, due to their greater lightness and ability to withstand to corrosion, and the possibility to be manufactured by deep drawing in complex shapes.

The rules presently in force, however, tend more and more to reduce the quantity of gaseous emissions and fuel vapors from the tanks, in order to reduce environmental pollution. For such purpose, the possible gas and vapor emission paths through apertures in the walls of the fuel tanks, necessary for connection to fittings and component parts, must be reduced to a minimum. In addition, the current approach is to install a large part of the components and accessories necessary for feeding the fuel to an engine or user, inside the same fuel tank.

In the manufacture of fuel tanks in plastic material, use generally is made of blow molding technology, according to which a parison or a tubular element of plastic material is extruded between two half molds, which are subsequently clamped for peripherally pinching the parison disposed between them; a pressurised fluid is then injected into the parison to cause the expansion and adhering the internal surfaces of the mold.

In fuel tanks manufacturing by blow molding technology, after the shaping step it is necessary to make some apertures in the walls of the tank to install the various components, both inside and outside the tank. All this involves extremely complex solutions, long and somewhat expensive manufacturing procedures, as well as a high risk of emission of hydrocarbons through apertures in the fuel tanks, in the event not being accurately sealed. Moreover, whenever it is necessary to manufacture fuel tanks by multi-layered material, any control of the wall thickness, proves to be extremely difficult to achieve.

In order to partially obviate these drawbacks, and to achieve a quantitatively high output, U.S. Pat. No. 6,372,176 and WO 02/14050 propose the use of the known twin-sheet thermoforming technology.

According to this technology, sheets of thermoplastic material are heated and processed in respective molding station in which each individual sheet of material is thermoformed in a shell, inside a corresponding mold; two shells are subsequently joined and sealed around their peripheral edges to form a fuel tank.

According to said documents, first and second sheets of plastic material are heated and processed along independent processing lines where each plastic sheet is moved from a loading station, to a thermoforming station in which each preheated sheet is thermoformed in a respective female mold; a first one of the molds is mounted in a facing-up disposition on a lower platen, while the second mold is mounted in a facing down disposition on an upper platen of a press.

After the two sheets has been thermoformed, the upper mold must be firstly aligned to the lower mold and then lowered to apply a force to fuse and sealing the thermoformed shells along their peripheral edges.

WO 03/097330 also relates to an apparatus for thermoforming twin-sheet hollow plastic articles in which again use is made of upwardly and downwardly facing thermoforming molds.

Operators can introduce various inserts and/or components in pre-established positions, before the two shells are joined and sealed to form a tank.

Although the solutions proposed in the prior art documents enable the twin-sheet thermoforming technology to be used for obtaining high production volumes, it is susceptible to further improvements tending to improve both the manufacturing process, and the thermoformed fuel tanks.

In fact, according to prior-art documents, the thermoforming of the lower shell takes place by maintaining a facing-up disposition of the cavity of the lower mold, while the thermoforming of the upper shell is carried out by maintaining a facing down disposition of the cavity of the upper mold.

All this entails considerable difficulties in thermoforming the upper shell, as well as structural unevenness in the fuel tank, due to a different sagging and stretching of the plastic sheets, in particular of the upper sheet in that the facing down cavity of the upper mold is opposite to the sag caused during the heating of the plastic sheet.

The different disposition and the different orientation of the two molds, as well as the different stretching conditions of the two plastic sheets caused by the sag, consequently entail structural unevenness and thickness differences in the two shells, which are difficult to eliminate.

Moreover, the different disposition of the molds in the two processing lines complicates the insertion of components into the fuel tank, making the installation extremely cumbersome and difficult for an operator to gain access in order to carry out the necessary checks and inspections. Replacement of the molds and the fixtures or jigs is also made difficult to carry out.

In the manufacture of storage tanks in plastic material, in order to provide the necessary structural resistance and the required hydrocarbon gas-tightness or barrier, in general use is made of layered plastic material by overlapping a number of plastic sheets having different chemical and/or physical properties.

Since, in the manufacture of plastic fuel tanks, according to the current technologies, large quantities of scraps are produced, and since certain costly plastic materials are difficult to recovery, there is the big problem of finding new molding systems whereby, in addition to improving the output, the scraps and, consequently, the molding costs of the tanks can be reduced to a minimum.

OBJECTS OF THE INVENTION

Therefore, the main object of this invention is to provide a method and a plant for thermoforming hollow bodies, in particular fuel tanks by means of the twin-sheet thermoforming technology, capable of providing greater simplification of the manufacturing cycle, and of processing in a substantially identical way the plastic sheets designed to form the two shells of a fuel tank.

Another object of the invention is to provide a method and a plant as mentioned above, whereby it is possible to manufacture fuel tanks characterised by a high degree of structural homogeneity.

A still further object of this invention is to provide a method and a plant for manufacturing fuel tanks by means of the twin-sheet thermoforming technology which, in addition to operating simultaneously on both processing lines, also make it possible to operate with extremely short production cycles, in a substantially continuous way, without downtimes, considerably simplifying the insertion of the components into the molds.

Another object of this invention is to provide a method for thermoforming fuel tanks in plastic material, whereby it is possible to substantially reduce the problems related to recovery of the scraps, in that it allows a smaller loss of valuable material.

A further object of the invention is to provide easy accessibility to the forming area, as well as facilitating the maintenance operations for the entire plant.

BRIEF DESCRIPTION OF THE INVENTION

According to the invention, all the above is achievable by means of a method for twin-sheet thermoforming of fuel tanks according to claim 1, and with a plant according to claim 7.

More precisely according to the invention a method for thermoforming plastic fuel tanks has been provided, according to which first and second sheets of thermoformable plastic material are heated and independently moved and processed, along a first, and respectively along a second processing line, from a loading station to a thermoforming station, the method comprising the steps of:

subjecting each plastic sheet to a heating;
pneumatically clamping the heated plastic sheet along its peripheral edge, and vacuum supporting the same sheet in a substantially flat condition while it is moved along the respective processing line;
positioning each heated plastic sheet above a respective shaping mold having a facing-up shaping cavity, while continuing to pneumatically hold the sheet in the aforesaid substantially flat condition;
lowering the heated plastic sheet into a respective mold; and
thermoforming each heated plastic sheet into a respective shell, making the same sheet to adhere to the upwardly open cavity of the shaping mold;
the method also comprising the supplementary steps of:
up-side down turning one of the shaping molds and the thermoformed shell;
superimposing said up-side down turned mold to the other one facing up mold, to overlap peripheral sealing areas of the two superimposed thermoformed shells; and
fusing and hermetically welding the overlapped sealing areas of the shells by pressing said overlapped sealing areas between clamping surfaces of the shaping molds.

According to another feature, the invention relates to a twin-sheet thermoforming plant for the manufacture of plastic fuel tanks comprising first and second twin-sheet thermoformed shells, according to which first and second thermoformable plastic sheets are independently heated and moved along respective first and second processing lines, from a loading station through at least one heating station, towards a respective thermoforming station where the individual plastic sheets are thermoformed in a first and a second shell into a respective first and second shaping mold, wherein:

said first and second shaping molds are side by side arranged with the open cavities of both molds facing upwards;
wherein each processing line comprises pneumatically actuable gripping means for gripping the plastic sheets around their peripheral edges, and a vacuum sheet holding device for the heated plastic sheets, said pneumatic gripping means and said vacuum holding device being movable along the processing lines; and vacuum control means for the vacuum holding device for supporting the heated plastic sheets in a substantially flat condition; and
drive means conformed and arranges to turn one mold upside down to superimpose to the other one and to cause welding of overlapped sealing areas of the thermoformed shells, by compression of the same molds.

Before heating at the thermoforming temperature, each plastic sheet can be subjected to a preheating, followed by a centering in a successive centering station, to allow a correct pneumatic gripping of the peripheral edges of the sheet; if required, the centering may precede the preheating step. In addition, by using special pneumatic frames, it is possible to substantially reduce the gripping surfaces of the sheets and consequently the scraps of material.

According to a further feature of the invention, the substantial flatness of the plastic sheets, both during the heating and the movement of the heated sheet towards the thermoforming station, can be suitably controlled by changing the softening temperature of the plastic material, and/or adjusting the vacuum inside the supporting device.

For the purposes of this specification, the term "substantially flat" is understood to mean a condition in which the heated sheet is pneumatically held on the peripheral edges, and is vacuum supported on the upper side, without sagging downwards to any great degree, due to the gravity.

According to another feature of the invention, the heating, centering and thermoforming steps of the plastic sheets along the two processing lines, can be carried out cyclically, by feeding the individual sheets along the two processing lines while several operations are carried out simultaneously, or in succession.

According to the invention, after the thermoforming and sealing of the two shells into a tank, it is possible to carry out a cooling step of the fuel tank in a separate cooling station, disposed at a side of the processing lines. Since the cooling of the molds and the thermoformed tank takes a considerable length of time, in this way it is possible to cool the tanks after the thermoforming, without stopping or affecting the manufacturing process. This can be achieved by disposing, on one side of one of the two processing lines, in correspondence with the thermoforming station, a cooling station comprising a rotary table or a reciprocable shuttle having two or more mold supporting zones, which can from time to time be aligned with the thermoforming stations of the processing lines, to support the closed molds and the thermoformed tank.

The two closed molds with the tank can be simply transferred onto the rotary table or onto the supporting shuttle. Consequently, whenever the sealing of the two shells and the cooling of the storage tank take place by feeding a pressurised fluid into the same tank, in correspondence with the cooling station it is necessary to make use of a suitable clamping press to maintain the tank closed into the two molds. Optionally, it is possible to make use of a special cage for containing the closed molds, as an alternative to the press in the cooling station.

According to a further feature of the invention, a method and a plant for twin-sheet thermoforming of storage tanks have been provided, whereby the two processing lines can be disposed and parallely arranged with both facing up molds at a same level; this greatly facilitates the access of one or more operators to the entire plant, for the necessary controls, such as for introduction of components into the two shells, as well as for all the necessary maintenance operations. Replacement of the molds is also greatly facilitated and can be carried out outside of the two processing lines, in correspondence with the cooling station.

BRIEF DESCRIPTION OF THE FIGURES

These and further advantages and features of the method and plant according to this invention, will be more clearly evident from the following description, with reference to the accompanying drawings, in which.

DETAILED DESCRIPTION OF THE INVENTION

Figure 1:
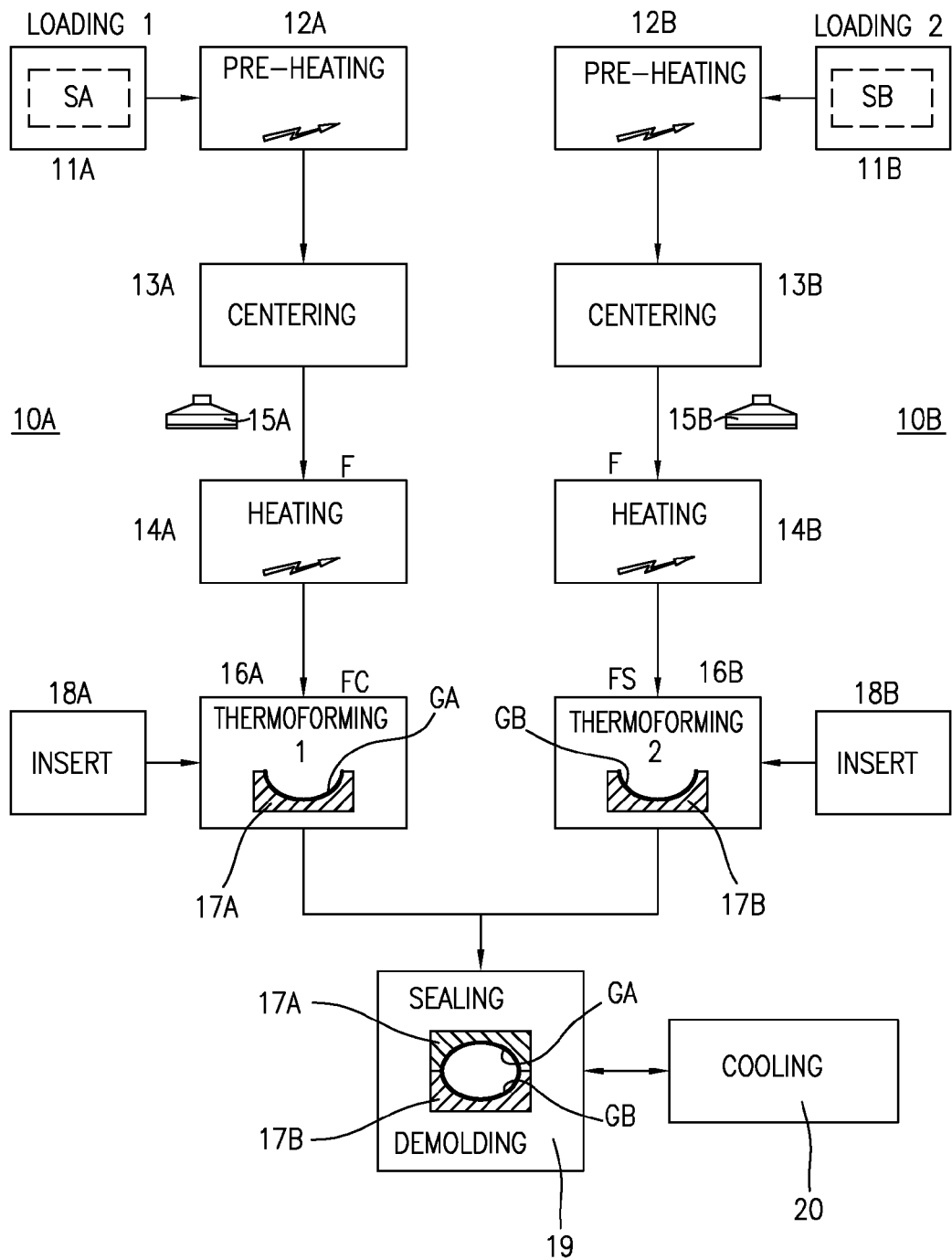
FIG. 1 shows a block diagram of the various steps and working stations, according to a preferential embodiment of the invention.

As shown in FIG. 1, the twin-sheet thermoforming of fuel tanks takes place by processing individual sheets of thermoformable plastic material along two separate processing lines 10A and 10B, which parallely extend from a loading station for the plastic sheets, to a thermoforming station through intermediate work stations; along the two lines 10A, 10B, the individual plastic sheets are heated and shaped in respective thermoformed shells, by subjecting the plastic sheets to a same processing steps, while they are moving in pairs through the various work stations of a plant.

For the purposes of this description, "thermoformable plastic sheet" is understood to mean any plastic material in sheet form, suitable for being shaped by a thermoforming process; plug assist may also be provided. The plastic sheets can either be of a single layer of suitable thickness, or layered, that is to say composed of several layers of plastic material of identical and/or of different thickness, having chemical and/or physical properties differing from one another.

As shown in FIG. 1, each processing line 10A, 10B comprises a number of work stations in which the various processing steps are carried out; in particular, in a first station 11A, 11B, a first loading step takes place, by picking up the individual sheets SA, SB from a pallet.

The individual plastic sheets SA, SB are picked up automatically and fed into the loading stations 11A, 11B by means of mechanical and/or pneumatic gripping devices; then are transferred to a preheating station 12A, 12B where the plastic sheets remain in a heater for the time necessary to bring them at a first preheating temperature lower than the thermoforming temperature of the same sheets. Even though it is preferable to preheat the plastic sheets SA, SB in order to reduce the working cycle times, the preheating phase may also be omitted.

The preheating temperature for the plastic sheets SA, SB is suitably controlled, for example, by making the sheets move along a heating path inside an air convection heater, in which the sheets remain for a heating period equivalent to several processing cycles, during which the individual sheets are heated gradually to a desired temperature.

Upon completion of the preheating step, each individual sheet SA, SB is transferred to a subsequent centering station 13A, 13B, where the sheet is positioned and oriented to be pneumatically picked up, as explained further on.

In the case of FIG. 1, the centering step 13A, 13B is carried out downstream, immediately after the preheating; in certain cases, this would imply having to maintain a comparatively low preheating temperature with respect to the thermoforming temperature, thereby increasing the final heating time. In order to obtain better centering conditions for the sheets, the latter may be preliminarily centred, prior to their introduction into the preheating oven; this embodiment offers the possibility of increasing the preheating temperature and consequently reducing the final heating time.

According to the exemplificative diagram of FIG. 1, after the pre-heated sheets have been centred in the stations 13A, 13B, the individual sheets are transferred to a subsequent final heating station 14A, 14B where they are heated is to a temperature close or equivalent to a thermoforming temperature, depending upon the properties of the plastic material or materials of which each individual sheet SA, SB is composed.

Figure 5:
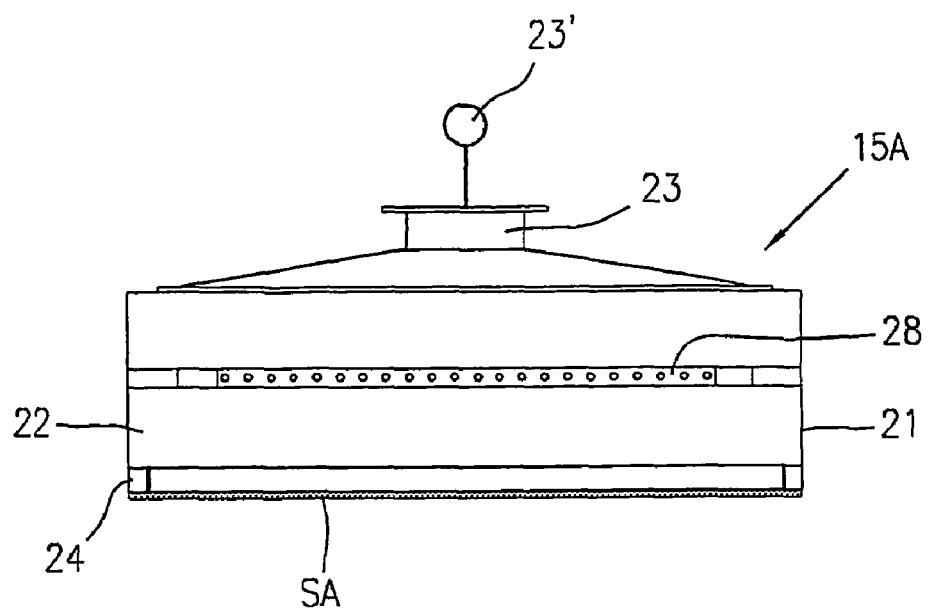
FIG. 5 shows a view of a vacuum bell for pneumatically gripping and vacuum supporting the plastic sheets along each processing line.
Figure 6:
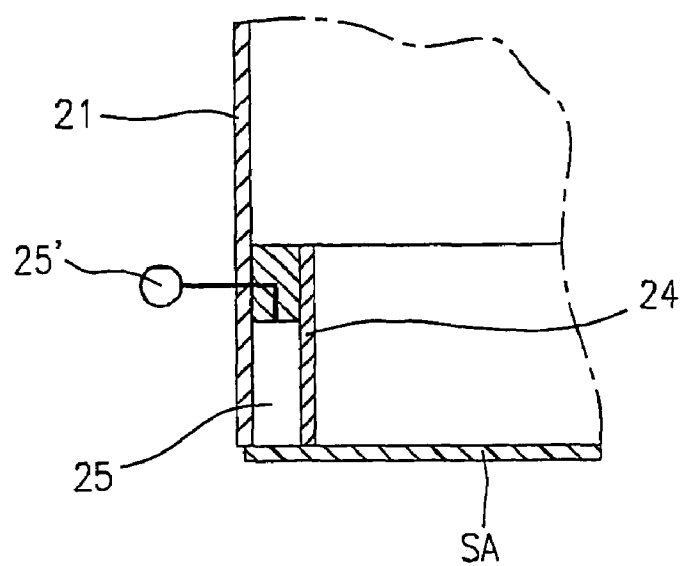
FIG. 6 shows an enlarged detail of FIG. 5.

In this connection, as schematically indicated in FIG. 1, the individual sheets SA, SB in the centering stations 13A, 13B are picked up by means of a suitable pneumatic gripping device 15A and 15B, movable above each processing line, for example of the type shown in FIGS. 5 and 6.

FIG. 5 shows, by way of example, a longitudinal cross-sectional view of the pneumatically actuate gripping and vacuum holding device 15A; the pneumatic gripping device 15B is wholly similar to the device 15A.

As shown, the pneumatic gripping and vacuum holding device 15A is provided by of a bell-shaped device having peripheral walls 21 forming a facing down vacuum chamber 22; the vacuum chamber 22 is provided with a cone-shaped upper portion ending with a fitting 23 for connection to an air suction source 23', necessary for creating a sufficient vacuum degree in the vacuum chamber 22 for supporting or holding the plastic sheet material SA in a substantially flat condition; by controlling the suction source 23', it is possible to control the vacuum degree in the vacuum chamber 22 of the bell-shaped device 15A and consequently the flatness of the plastic sheet SA.

The shape and size of the device 15A substantially correspond to those of the plastic sheets SA, SB to be thermoformed. Consequently, the bell-shaped device 15A in FIGS. 5 and 6, is provided at the lower edge, with pneumatically actuable gripping means for gripping the sheet SA around its peripheral edge, forming an adequate airtight seal.

As shown in FIG. 5 and in the enlarged detail of FIG. 6, the pneumatic gripping means for gripping the sheet SA may comprise a flat peripheral frame 24 secured inside and spaced apart from the lateral walls 21 so as to form a slot 25 connectable in a controlled way to an air suction source 25'.

The pneumatic gripping means for gripping the plastic sheets can obviously be differently shaped or conformed, compared to those shown. Lastly, also in FIG. 5, it can be seen that the bell-shaped device 15A for gripping and vacuum supporting the sheets SA, SB, is provided with a bank 28 of heating elements for heating the sheets SA, SB, within the same vacuum chamber 22.

Picking up and moving each individual preheated sheet SA, SB, constitutes one of the most delicate steps of the entire process, in that, if the heated sheets were not properly gripped and supported, due to the gravity they would tend to sag downwards, and undergo uncontrolled deformation which would have a negative effect on the subsequent thermoforming of the shells in the stations 16A, 16B.

Therefore, according to a preferential embodiment of the invention, the individual sheets SA, SB in the respective centering stations 13A, 13B are picked up pneumatically in a controlled way at their peripheral edges, and vacuum supported by means of the bell-shaped devices 15A, 15B of FIG. 5, maintaining them in a substantially flat condition while they are being transferred to the heating stations 14A, 14B. In these stations, the individual sheets SA, SB are further heated to bring them up to a temperature equivalent or close to the thermoforming temperature. The heating of the sheets SA and SB in the two heating stations 14A and 14B may takes place on both sides from below by means of a bank of heating elements 47 which each station 14A, 14B is provided with, and from above by means of the bank of heating elements 28 inside the bell-shaped device 15A and 15B.

After the heating step at the thermoforming temperature has been performed in the stations 14A, 14B, the heated plastic sheets SA, SB are transferred by means of the devices 15A, 15B to the subsequent stations 16A, 16B to be subjected to the thermoforming into the molds 17A, 17B for shaping them into corresponding thermoformed shells GA, GB according to the procedure illustrated further on in FIGS. 2A-2H of the accompanying drawings.

As mentioned previously, the transfer of the heated sheets SA, SB takes place while supporting them by vacuum in a flat or substantially flat condition, that is to say, devoid of deep sagging, by means of the bell-shaped devices 15A, 15B which can therefore be moved rapidly between the various in-line work stations.

In order to maintain a substantial flattened condition of the heated sheets, preventing the latter from sagging excessively as the heating temperature gradually increases, the sagging of the sheets is detected and the vacuum degree created above the heated sheets by the devices 15A, 15B, is constantly controlled and adjusted so as to prevent an excessive sagging, with the risk of the plastic sheets striking against fixed parts of the plant, preventing or hindering their correct positioning above the molds 17A, 17B.

As shown in greater detail further on, the essential feature of this invention resides in thermoforming the plastic sheets SA, SB while maintaining substantially identical thermoforming conditions for both of them, so as to obtain two structurally homogeneous thermoformed shells GA, GB.

This can be obtained, according to the invention, by disposing both the molds 17A, 17B side by side at a same level, with the respective shaping cavities facing upward.

The side-by-side and upwardly oriented disposition of the two thermoforming molds, enables the sheets to be also prestretched and deposited on the molds, simply by gravity. This not only simplifies the thermoforming enormously, making it possible to obtain the desired structural homogeneity of the two shells GA, GB, but also facilitates the operations of introducing inserts and components into one or both the shaped shells before sealing the tank. In fact, thanks to the upward oriented disposition of the cavities for both the molds 17A, 17B, it is possible to carry out the introduction of the inserts and/or the various components, both prior and subsequent to the thermoforming, directly in each mold or into the thermoformed shells, while the latter still remain in the respective mold, picking up by an operator the various components from a side station 18A and 18B, as shown in greater detail in FIGS. 7 and 8.

Upon completion of the thermoforming of the two shells and the introduction of the various components, as mentioned previously, still in one of the thermoforming stations a subsequent step may be carried out consisting in superimposing the two molds 17A, 17B, fusing and sealing the two thermoformed shells at overlapped sealing areas, as schematically shown by the block diagram 19 in FIG. 1.

This can be achieved in any suitably way; for example, by upside down turning one of the molds onto the other one, by simple rotation around an horizontal axis, or in any other way capable of allowing the superimposition of the two molds with the respective thermoforming shells, one turned upside down on top of the other and with their peripheral sealing area matching.

Figure 3:
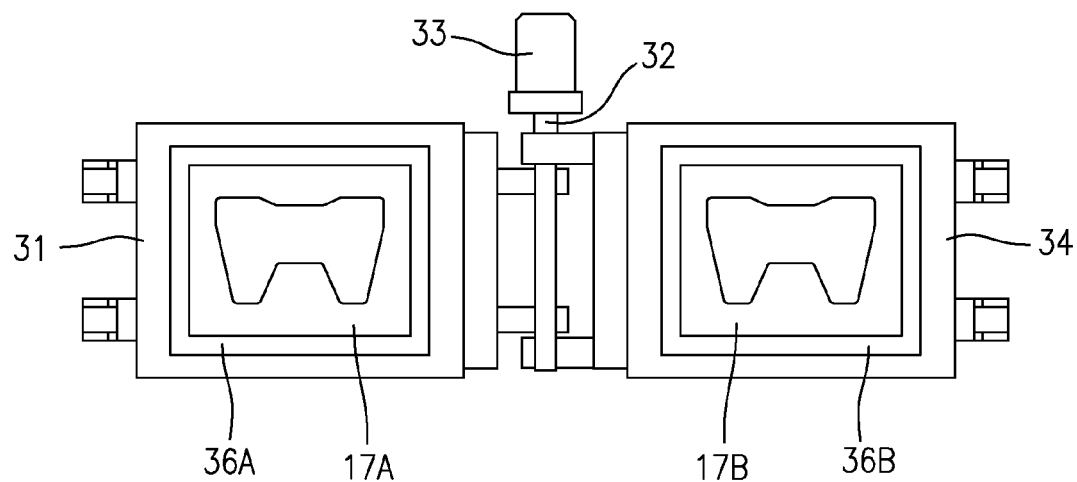
FIGS. 3 and 4 show a top view and respectively a side view of a book press of a thermoforming station, in an open condition.
Figure 4:
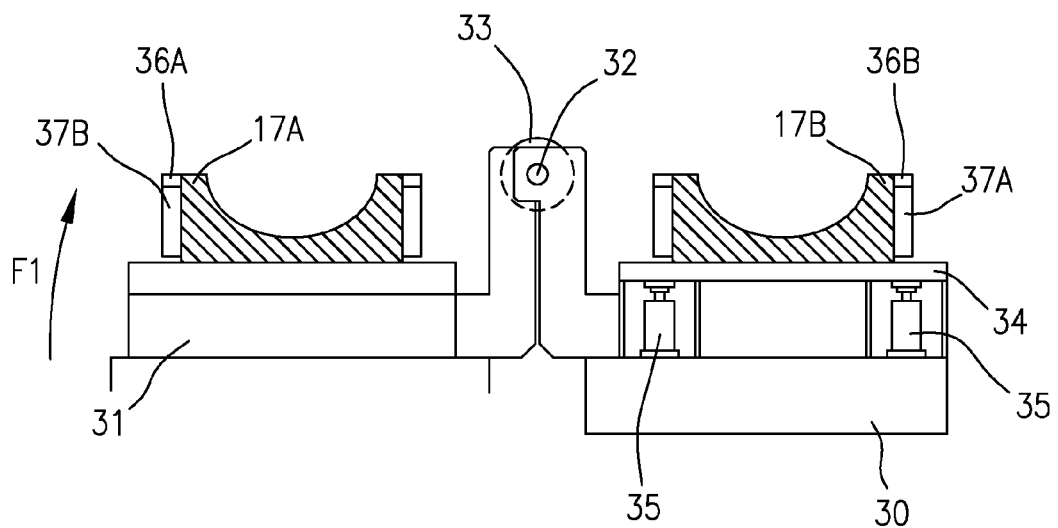

In this connection, as schematically shown in FIGS. 3 and 4, use can be made of a book-like press.

The thermoforming press comprises a stationary frame 30 and a movable frame 31 which can be overturned by 180° around a rotational axis 32 connected to a drive motor 33, or in any other suitable way.

The stationary frame 30 of the press is in turn provided with a platen 34 for supporting the mold 17B; the platen 34 is vertically movable by means of hydraulic cylinders 35 for providing the necessary clamping force for closing the molds 17A, 17B and sealing the overlapped areas of the two shells, in the closed condition of the molds shown by the block diagram 19 in FIG. 1.

From FIGS. 3 and 4 it can also be seen that, according to another feature of the invention, pneumatically actuable sheet gripping means are provided for each mold 17A, 17B; the gripping means comprises a pneumatic frame 36A, 36B for gripping the sheets SA, SB from below, around their peripheral edges, on the side oppsite to that of the gripping device 24 of the bell-shaped device 15A, 15B as explained further on. In this connection the pneumatic frames 36A, 36B are shaped and sized identically to the pneumatic frame 24 of two bell shaped devices 15A and 15B. This proves to be extremely advantageous in that it enables the individual sheets SA, SB to be supported along the two processing line 10A, 10B and transferred by the bell shaped devices 15A, 15B above the shaping molds 17A, 17B, by gripping the sheets themselves along a narrow peripheral strip. This makes it possible to considerably reduce scraps, and losses of valuable material, compared to the conveying systems previously used in the usual thermoforming plants which make use of belts or other similar conveying systems for the plastic sheets.

Each pneumatic frame 36A, 36B, can be vertically moved upwards, with respect to the mold 17A, 17B, by means of suitable control cylinders 37A, 37B. The pneumatic gripping frames 36A and 36B can be shaped with a flat or variable profile, by providing articulated frame sections, to adapt to molds with flat or three-dimensional shaped edges; moreover, each frame can be provided also with mechanical gripping means for securing the edges of the individual sheets.

Once the two molds 17A, 17B with the corresponding thermoformed shells have been placed one on top of the other, the peripheral sealing areas of the two shells are pressed and fused one against the another by sealing edge zones of the thermoforming molds themselves, thereby fusing and hermetically sealing a fuel tank.

Upon completion of the thermoforming and sealing of the two shells, it is necessary to perform a cooling step for cooling the tank, before removing the same from the molds.

The cooling can be carried out in any suitable way, for example by circulation of water or a cooling fluid within the mold walls, or by circulation of air while maintaining the tank under pressurised condition to urge against the thermoforming molds.

Although the cooling can be carried out directly along the processing line, in one of the two thermoforming stations 16A, 16B, since the cooling of the molds and the fuel tanks takes a considerable length of time, according to another feature of this invention it is preferable to carry out the cooling separately from the processing line; in this connection, the closed molds with the thermoformed tank are transferred to a cooling station 20, on a side of the processing lines 10A, 10B. By removing the closed molds and carrying out the cooling in a side station, separate from the processing lines, it is possible to operate in a continuous cycle, without causing delays or dead times in the manufacturing process, which can continue as explained further on. In addition, by removing the molds from the processing lines and transferring them to a separate cooling station, it is possible to easily work on the same molds for maintenance operations and/or for their replacement.

After the fusing and sealing of the two shells, depending on whether the cooling is to be carried out with the fuel tank under pressurised conditions or not, the closed molds must be transferred from one of the thermoforming stations to the cooling station.

Figure 9:
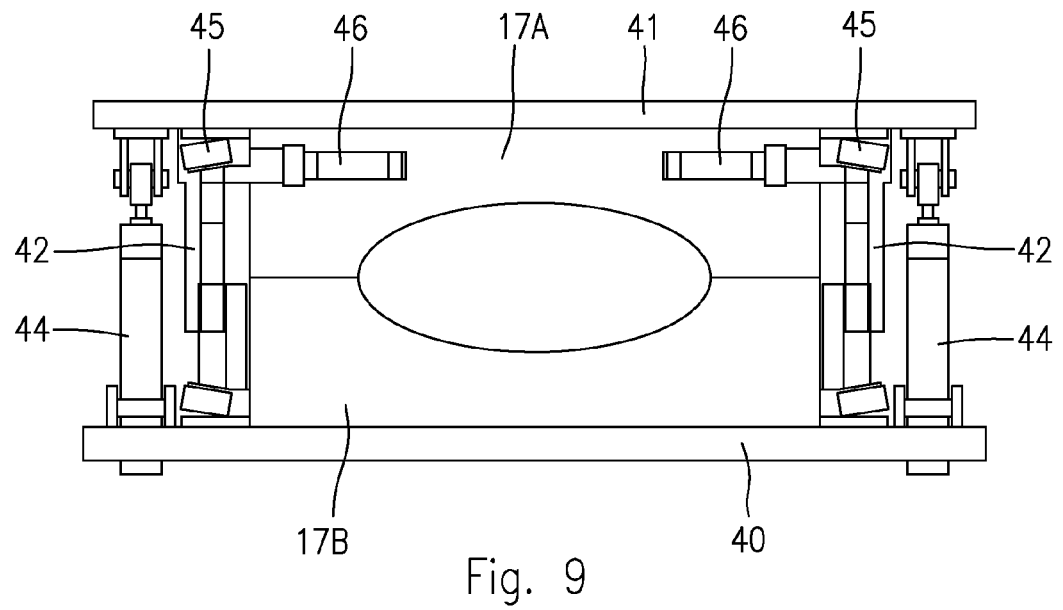
FIGS. 9 and 10 show a front view and a side view of a cage in a closed and an open conditions, for containing the closed molds during cooling.
Figure 10:
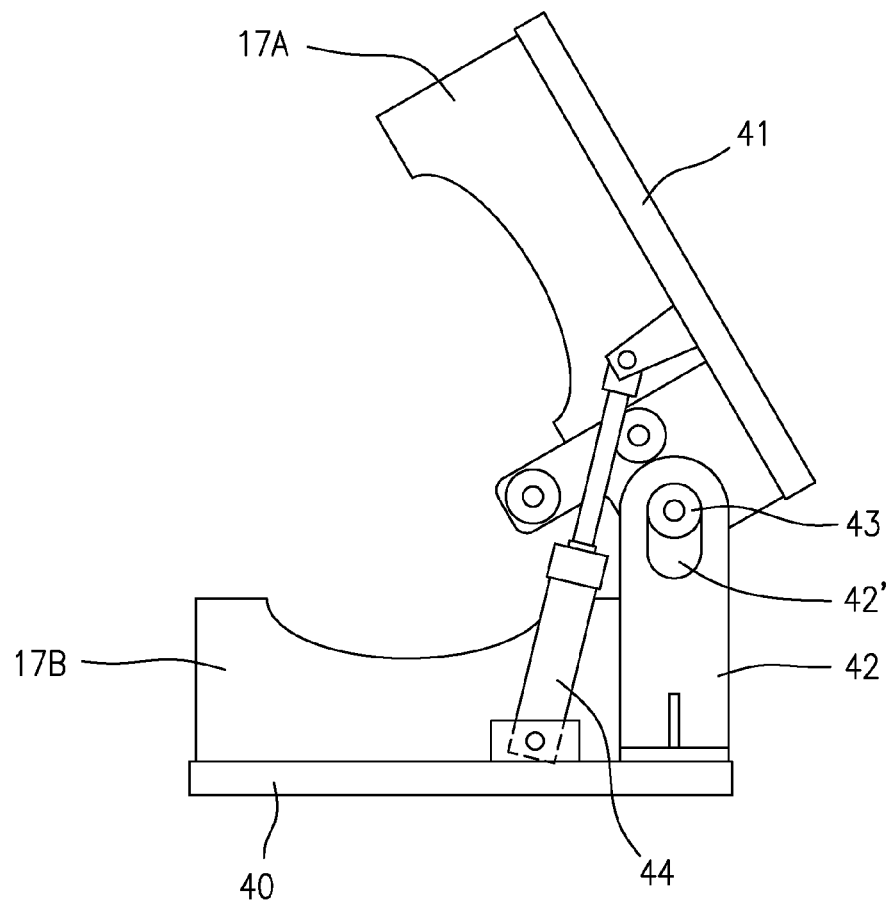

In the event the cooling being carried out with the tank under pressurised conditions, in order to counteract the pressure inside the molds, it is advisable to close the latter in a special retaining cage, shown in FIGS. 9 and 10 of the accompanying drawings.

For example, as shown in FIGS. 9 and 10, the cage may comprises a lower platen 40 and an upper platen 41 at which are secured the two molds 17A, 17B. The upper platen 41 is articulated to two lateral posts 42 to rotate around an articulation axes 43 capable to vertically slide along an elongated hole 42'. The rotational movement of the upper platen 41 is controlled by two hydraulic cylinders 44, while wedges 45 actuated by hydraulic cylinders 46 enable the upper platen 41 to be locked to the two lateral posts 42, in the closed condition of FIG. 9.

With reference to the diagram of FIGS. 2A-2H, a more detailed description is given hereunder of the operating method of the twin-sheet thermoforming plant according to this invention.

The FIGS. from 2A to 2H schematically show the individual operative steps which are carried out in parallel and in succession in the various work stations along the two processing lines, for example between the centering station 13A of the line 10A, and the thermoforming station 16A, it being clearly understood that the same processing steps will be simultaneously carried out in parallel on the other processing line 10B.

As mentioned initially, the individual plastic sheets SA in the loading station 11A, are picked up and introduced into the oven 12A where they are held for a pre-established period of time, in the region of a few dozen minutes, depending upon the nature and the properties of the plastic material, making them undergo a gradual preheating to a first temperature lower than the thermoforming one.

After completion of the preheating phase, at the outlet of the oven 12A the preheated sheet SA is transferred to the centering station 13A, for example by means of a roller table 45 or other conveying system, where an appropriate centering device 46 (FIG. 2A) is raised for accurately positioning and orientate each sheet SA1, to be perfectly aligned with the pneumatic gripping device 15A which in the meantime has been moved above the centering station 13A.

Upon completion of the centering of the sheet SA1, the latter is pneumatically gripped around its peripheral edge and raised by means of the pneumatic gripping device 15A which is supported to move vertically and/or horizontally in the directions of the double arrows F2 and F3, above the processing line 10A.

The device 15A for gripping the sheets is conformed and operates for pneumatically picking up the sheet SA1 and for forming a seal around the peripheral edge so that above the sheet itself inside the bell 15A it is possible to create, in a controlled way, a certain vacuum degree capable of holding the sheet SA1 in a substantially flat condition, as shown.

The pneumatic gripping device 15A with the sheet SA1 can consequently move from the centering station 13A, to the heating station 14A and the thermoforming station 16A, as schematically shown in FIGS. 2A, 2B, 2C and 2D of the accompanying drawing.

In correspondence with the centering station 13A, the pneumatic gripping device 15A picks up the already centred sheet SA1, holding it pneumatically around the peripheral edge.

Figure 2:
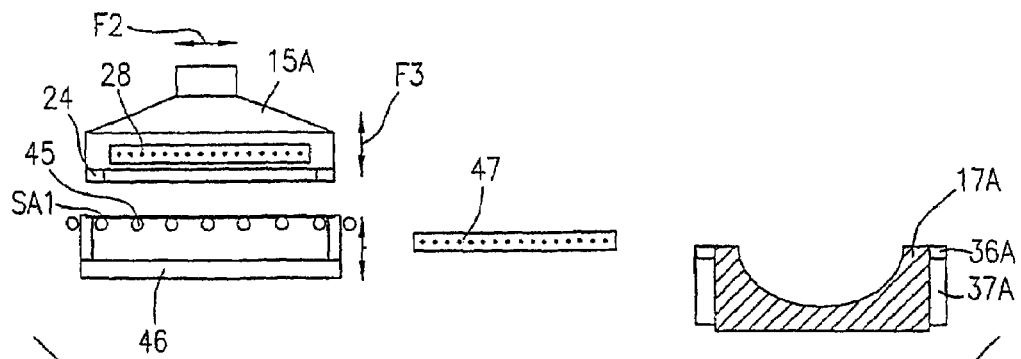
FIGS. 2A-2H show flow charts illustrating the various operations carried out along each processing line.
Figure 2:
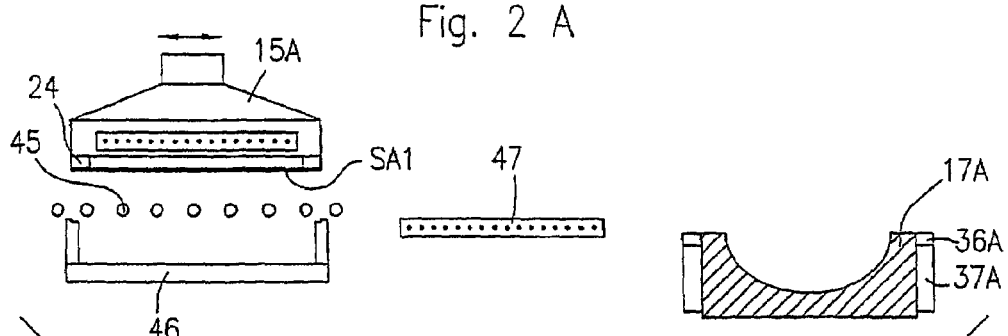
Figure 2:
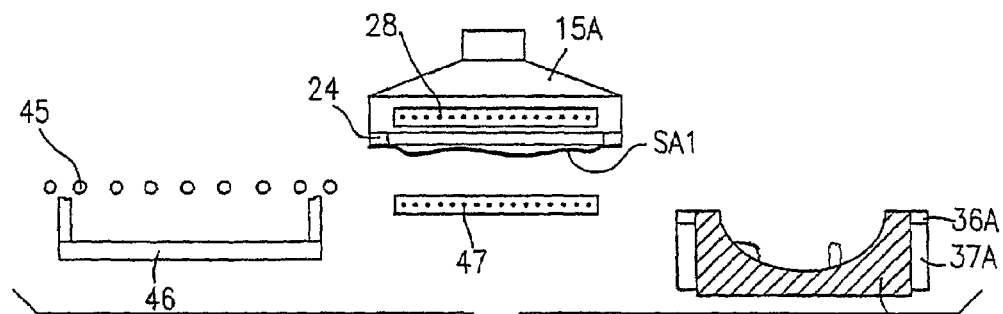
Figure 2:
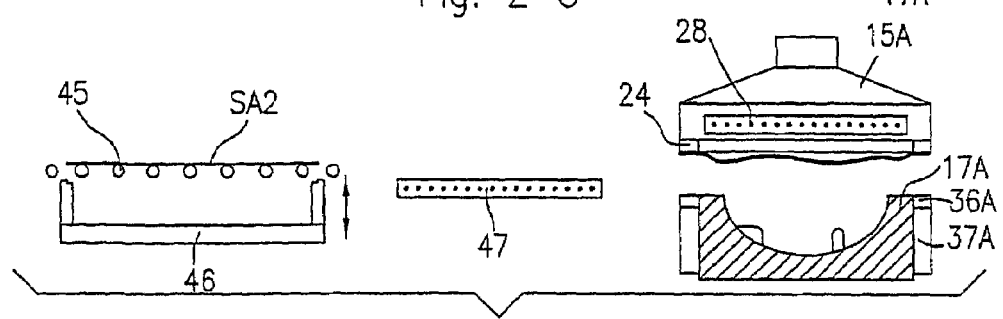
Figure 2:
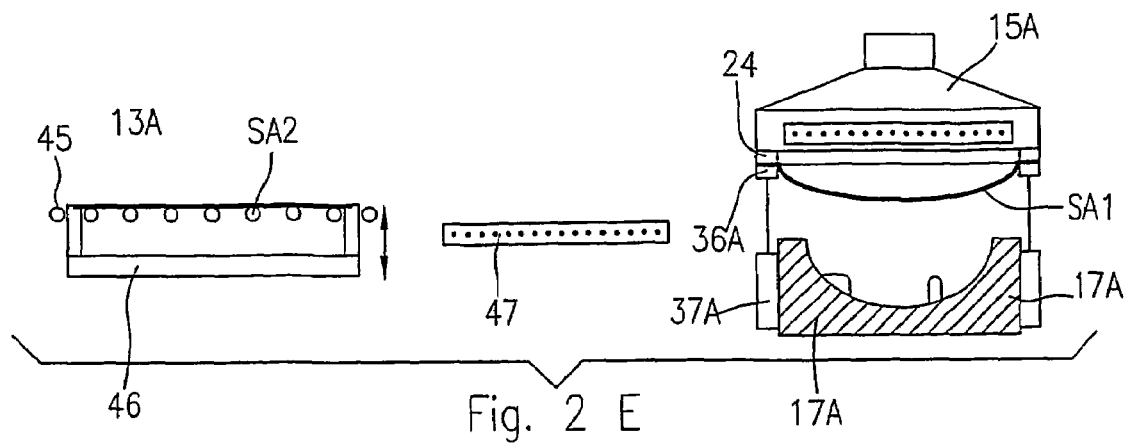
Figure 2:
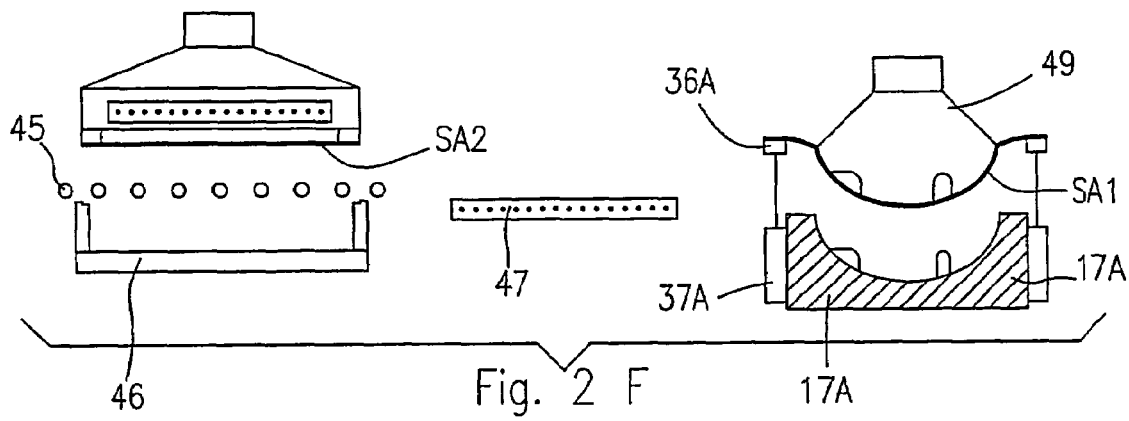
Figure 2:
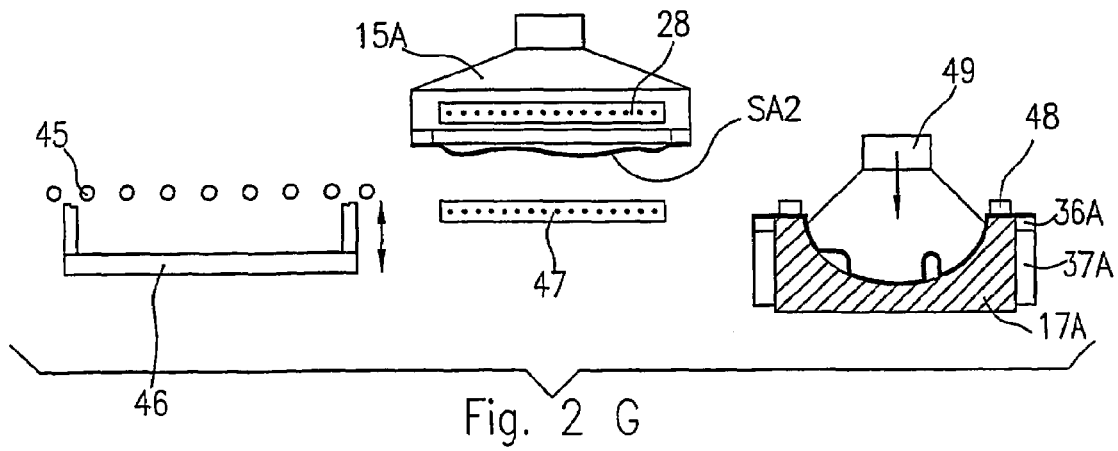
Figure 2:
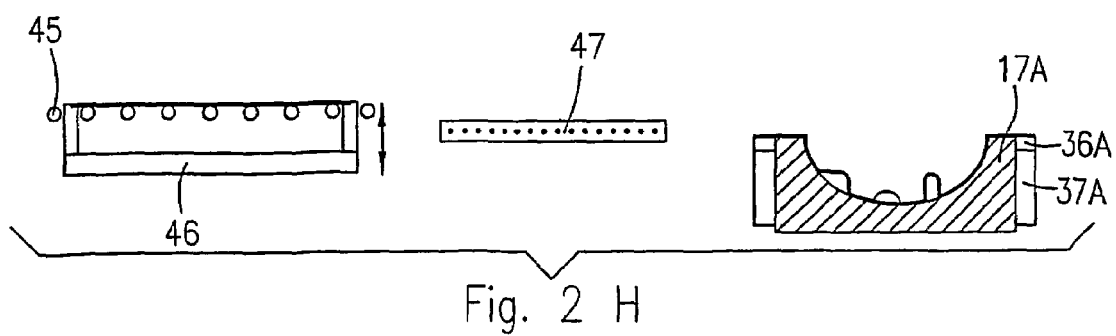

Immediately after, the heater 28 is switched on, the bell 15A is connected to a vacuum source and then, from the centering station 13A the pneumatic gripping device 15A with the preheated sheet SA1 is moved towards the final heating station 14A, as shown in FIG. 2C.

During this step, the plastic sheet material SA1, likewise to the sheet SA2, is further heated to the required thermoforming temperature, both by the upper heater 28 of the gripping device 15A, and by a lower heat 47 positioned below in the same heating station 14A. Since during this heating step the plastic material of the sheet is brought up to a temperature close to melting point, and would consequently tend to sag downwards by gravity, the vacuum in the bell of gripping device 15A is maintained and suitably controlled so as to keep the sheet SA1 in a substantially flat condition, throughout the entire heating period until it has been positioned above the thermoforming mold 17A.

In the meantime, several operators have taken care to introduce inserts into the mold 17A, as schematically shown in FIG. 2C.

The plastic sheet SA1 is then heated on both sides in a wholly controlled way. Upon completion of the heating, the gripping device 15A is quickly moved above the thermoforming mold 17A, as shown in FIG. 2D.

The gripping and vacuum holding device 15A with the sheet SA1 heated to the thermoforming temperature, is transferred while maintaining the heating by means of the heater 28, and the vacuum, for the reasons explained previously.

At this point, by reducing the vacuum, or controlling the pressure within the gripping and holding device 15A, it is possible to form a sag by gravity, by making the sheet sag downwards, as shown in FIG. 2E; simultaneously, the second gripping device 36A associated with the mold 17A, is raised to grip the sheet SA1 from below, around the peripheral edge, on the side opposite to that of the upper gripping frame 24 of the gripping and holding device 15A, as again shown in FIG. 2E.

In the meantime, a new preheated sheet SA2 can be transferred to the centering station 13A.

At this point, the device 15A releases the sheet SA1 which is immediately gripped from below by the second gripping device 36A of the thermoforming mold 17A; the first gripping and sheet holding device 15A now can be made to return towards the centering station 13A where it can pick up a second sheet SA2, as shown in FIG. 2F.

The same FIG. 2F shows that the second gripping device 36A which holds the first sheet SA1 in a sagging condition, is lowered, and stopped at a distance from the mold 17A, while a shaping plug 49 is made to adhere from the above to the sag of the sheet SA1.

Both the shaping plug 49 and the gripping device 36A are now lowered simultaneously bringing the sheet SA1 to rest against the internal surface of the mold 17A. By activating vacuum in the mold 17A, in a per se known way, the sheet SA1 is shaped into a corresponding thermoformed shell by the combined action of the vacuum inside the mold 17A and the pressure of the shaping plug 49.

During the thermoforming of the shell, the peripheral edge of the plastic sheet SA1 is retained against the peripheral edge of the mold 17B, for example by means of a presser 48, or in any other suitable way, as shown in FIG. 2G.

Upon completion of the thermoforming of the shell, when the plastic material is still at a high temperature, the plug 49 is raised to allow the introduction of any further inserts or components into the thermoformed shell. All this can be carried out quickly and easily through the upward facing of the molds, thereby greatly simplifying all the operations on both processing lines.

As mentioned previously, all the operations described with reference to the FIGS. from 2A to 2H, are carried out simultaneously and cyclically on two plastic sheets SA1, SB1 along the two processing lines 10A and 10B. Consequently, in both cases, the thermoforming of the two shells takes place in a substantially identical way, with both the molds facing upwards; moreover, in both cases, vacuum and gravity are appropriately used for controlling the formation of the sag in each of the two sheets SA1, SB1.

It is now necessary to seal the two shells to form a fuel tank; in this connection, the hermetical sealing of the two thermoformed sheets SA1 and SB1 is carried out by tightly pressing and fusing their sealing areas one against the other around the peripheral edges of the two shells.

This can be achieved, for example, by overturning one of the two molds by 180°, for example by making the mold 17B rotate in the direction of the arrow F1 in FIG. 4, around the rotational axis 32, upside down the other mold 16A, as shown by the block diagram 19 in FIG. 1.

At this point, the two molds are tightly pressed one against the other, exerting an adequate clamping force, and pinching the two sealing areas of the two shells thereby fusing them hermetically together.

After having completed a fuel tank, the latter can be cooled while maintaining it closed in the two molds. Upon completion of the cooling, the two molds, still closed, can be moved back to one of the two thermoforming stations 17A, 17B and opened to carry out the demolding and discharge of the finished fuel tank, directly in the same thermoforming station.

All this can be carried out within an extremely short period of time, during the execution of a subsequent operative cycle, so as to use the same molds again for manufacturing a next fuel tank.

Therefore, by operating in a continuous cycle with the two processing lines 10A and 10B, according to the previously described procedures, it is possible to produce plastic fuel tanks, complete with the respective accessories and components, in an extremely limited time, reducing the scraps of material due to the combined use of the two pneumatic gripping and conveying devices along the two processing lines, makes it possible to form sealing having extremely limited surfaces; according to the invention it is also possible to produce plastic fuel tanks complete with their respective accessories having improved structural characteristics.

Figure 7:
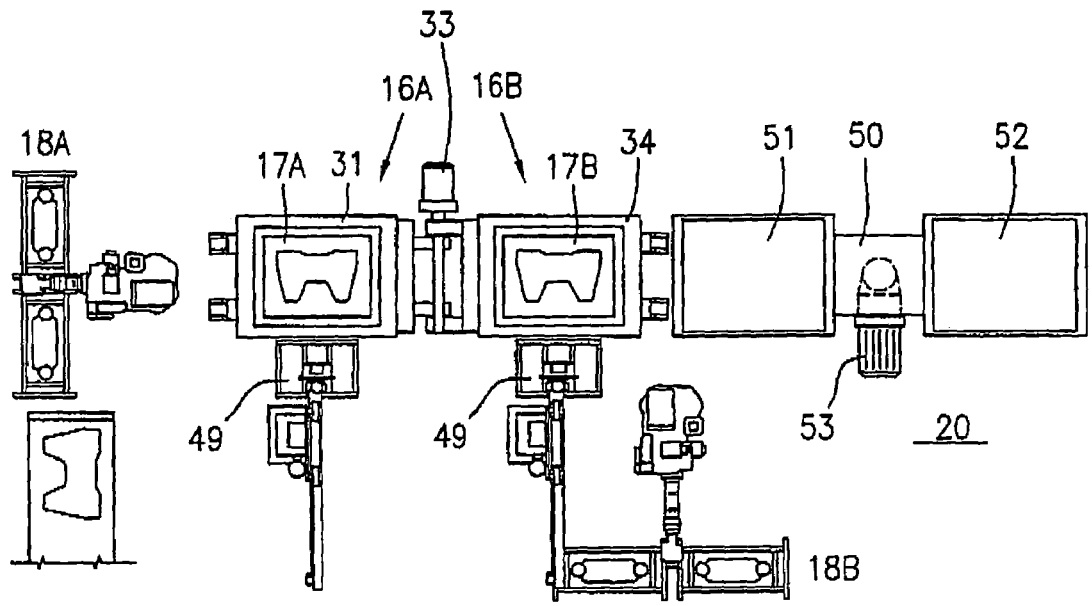
FIG. 7 shows a top view of the plant, in correspondence with thermoforming station, according to a first embodiment.
Figure 8:
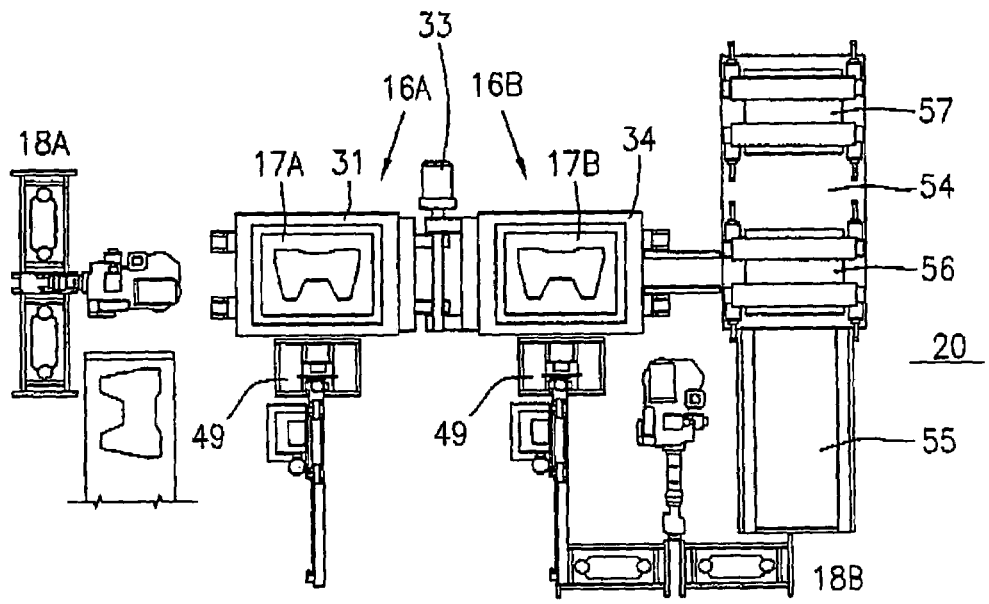
FIG. 8 shows a view similar to that of the previous figure, according to a further embodiment.

FIGS. 7 and 8 show, by way of example, two possible solutions with regard to the cooling station, in addition to other details of the thermoforming stations and the stations for introducing the inserts and/or components into the molds and/or into the two thermoformed shells; in said figures, the same reference numbers used as per the previous figures, to indicate similar or equivalent parts.

As shown in FIG. 7, the cooling station 20 comprises a rotary table 50 having two or more molds supporting surfaces 51, 52, onto which the closed molds 17A, 17B are transferred for the cooling phase.

The rotary table 50 is made to rotate and indexed by a motor 53 in order to align from time to time one of the mold supporting surfaces 51, 52, with the thermoforming station, to allow the transfer of the closed molds, for example, between the thermoforming station 16B and the surface 51, while another closed molds undergoing cooling is already disposed on the surface 52 or on the other surfaces of the rotary table. FIG. 7 schematically indicates various robots or operators for the movement of the shaping plug 49, or for picking up and automatically introduce the inserts into the molds, or for discharging the finished fuel tanks.

The example of FIG. 8 differs from the previous figure in that the cooling station 20 now comprises a shuttle 54 reciprocable along a guide 55, which extends on a side parallel to the processing line 10B. The shuttle 54 is provided with two mold supporting surfaces 56, 57 which can be aligned with the thermoforming station 16B, by appropriately moving the shuttle along the guide 55.

In both cases, the mold supporting surfaces 51, 52 of the rotary table 50, or the mold supporting surfaces 56, 57 of the shuttle 55, can be used for carrying out the replacement of the molds, at each change of production, or for other requirements.

It is understood that what has been described with reference to the accompanying drawings, has been given purely by way of example in order to illustrate the general features of the method and the plant according to this invention; therefore, other modifications or variations may be made, without thereby deviating from the scopes of the claims.

The invention claimed is:

1. A plant for manufacturing plastic fuel tanks comprising first and second twin-sheet thermoformed shells (GA, GB), according to which first and second thermoformable plastic sheets (SA, SB) are independently heated and moved along respective first and second parallely arranged processing lines (A, B), from a loading station (11A, 11B) through at least one heating station (12A, 14A; 12B, 14B), towards a respective thermoforming station (16A, 16B) where the individual plastic sheets (SA, SB) are thermoformed in a first and a second shaping mold (17A, 17B) into a first and second respective shell (GA, GB), wherein:

said first and second shaping molds (17A, 17B) are side by side arranged with the open cavities of both molds (17A, 17B) facing upwards;

wherein each processing line (A, B) comprises a pneumatically actuable gripper formed from an air suction frame (24) configured for gripping on a side of the plastic sheets (SA, SB) around their peripheral edges, and a vacuum sheet holding device (15A, 15B) including a vacuum chamber (22) for holding the heated plastic sheets (SA, SB), said pneumatic gripper (24A) and said vacuum sheet holding device (15A, 15B) being movable along the processing lines (A, B); and a vacuum control device including an adjustable vacuum source to control a vacuum degree in the vacuum chamber (22) of the vacuum sheet holding device (15A, 15B) for supporting the heated plastic sheets (SA, SB) in a substantially flat condition;

a pneumatic gripping device comprising said air suction frame (24), a corresponding pneumatic gripping frame (36A, 36B) movingly supported by control cylinders (37A, 37B) on each mold, and a drive (33) conformed and arranged to turn one mold of molds (17A, 17B) upside down to superimpose to the other mold of molds (17A, 17B) and to cause welding of overlapped sealing areas of the thermoformed shells (GA, GB), by compression of the overlapped sealing areas by the molds (17A, 17B), wherein sheet transfer device (15a) includes a vacuum box or bell element defining a bottom open vacuum chamber, movable up and down in respect to the processing line, and along the same processing line, the vacuum box or bell element is provided with a pneumatic clamping device having at least one air suction channel peripherally arranged around the edges of the vacuum box or bell element, the air suction channel is connectable to an air suction source to clamp the sheet SA at its upper side along its peripheral edge, and to close the vacuum chamber by tightly clamping the plastic sheet SA, and the vacuum box is connectable to the vacuum source by vacuum control means for vacuum holding the heated sheet SA in a suspended, horizontal and substantially flat condition, during movement of the transfer device (15a) along the processing line.

2. The plant for manufacturing plastic fuel tanks according to claim 1, comprising a sheet preheating station (12A, 12B).

3. The plant for manufacturing plastic fuel tanks according to claim 1, comprising a sheet centering station (13A, 13B).

4. The plant for manufacturing plastic fuel tanks according to claim 3, wherein the sheet centering station (13A, 13B) is provided upstream of the sheet preheating station (12A, 12B).

5. The plant for manufacturing plastic fuel tanks according to claim 3, wherein the centering station (13A, 13B) is provided between the preheating station (12A, 12B) and a second heating station (14A, 14B) for the plastic sheets (SA, SB).

6. The plant for manufacturing plastic fuel tanks according to claim 1, wherein the vacuum sheet holding device (15A, 15B) comprises heating elements (28) for the plastic sheets (SA, SB).

7. The plant for manufacturing plastic fuel tanks according to claim 1, wherein said vacuum sheet holding device (15A, 15B) is in the form of a pneumatically actuable suction bell.

8. The plant for manufacturing plastic fuel tanks according to claim 1, comprising a mold cooling station (20) on one side of the processing lines (A, B), in a side aligned condition with a thermoforming station (16A, 16B), the mold cooling station (20) being configured for transferring the closed molds (17A, 17B) between the thermoforming station (16A, 16B) and the cooling station (20) of the plant.

9. The plant for manufacturing plastic fuel tanks according to claim 8, wherein the cooling station (20) comprises a rotary table (50) having a plurality of mold supporting surfaces (51, 52).

10. The plant for manufacturing plastic fuel tanks according to claim 8, wherein the cooling station (20) comprises a reciprocable mold supporting shuttle (54) parallely arranged to the processing lines (A, B), said shuttle (54) being provided with at least a first and a second mold supporting surfaces (55, 56).

11. The plant for manufacturing plastic fuel tanks according to claim 8, wherein a device for transferring the molds (17A, 17B) comprise a mold clamping cage (40, 41) reciprocable between a thermoforming station (16A, 16B) and the cooling station (20).

12. The plant for manufacturing plastic fuel tanks according to claim 1, wherein said drive means for upside down turning one mold (17B), comprises a book press.

\* \* \* \* \*